A. A. FREEMAN.

Car-Axle Boxes.

No. 6,449. Reissued May 25, 1875

Witnesses.
J. Holmes.
Alexander H. Morgan

Inventor.
Albert A. Freeman
By Isaac R. Oakford
Attorney

BEST AVAILABLE COPY

UNITED STATES PATENT OFFICE.

ALBERT A. FREEMAN, OF PHILADELPHIA, PENNSYLVANIA.

IMPROVEMENT IN CAR-AXLE BOXES.

Specification forming part of Letters Patent No. 63,379, dated April 2, 1867; reissue No. 6,449, dated May 25, 1875; application filed April 20, 1875.

*To all whom it may concern:*

Be it known that I, ALBERT A. FREEMAN, of Philadelphia, Pennsylvania, have invented an Improvement in Axle-Boxes; and I do hereby declare the following to be a full, clear, and exact description of the same, reference being had to the accompanying drawings, and to the letters of reference marked thereon.

My invention consists of certain V-shaped guides, adapted to and combined with the hanger and axle-box of a railway-car, substantially as hereinafter described, so that the box may always be maintained in its proper position without interfering with the free vertical movement of the hanger, and so that the guides may be readily packed or replaced with new ones, thereby obviating the necessity of abandoning either the box or the hanger when the guides are worn.

Figure 1:
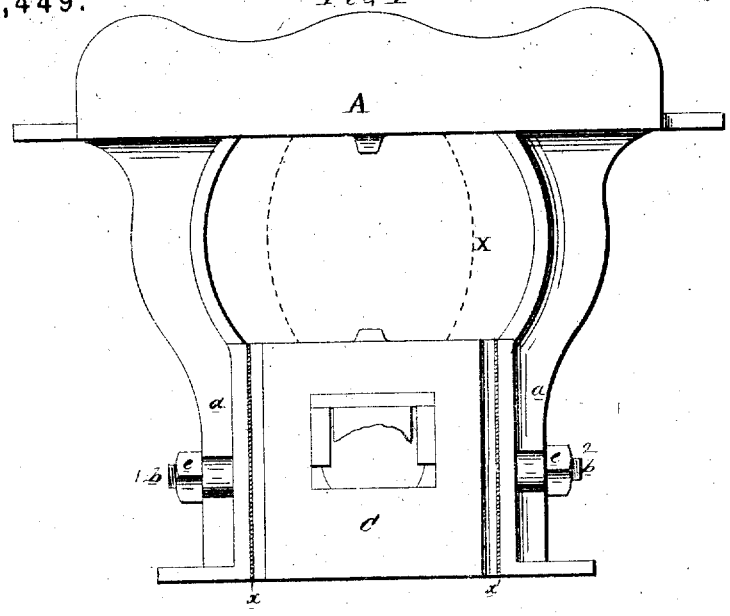
Figure 2:
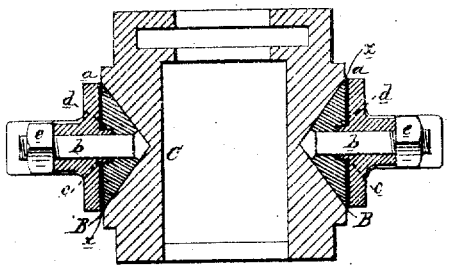
Figure 4:
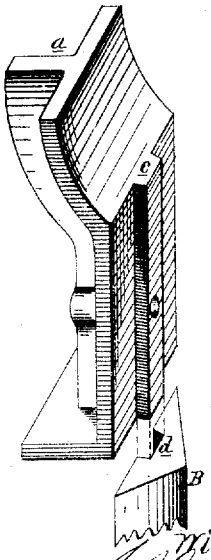
Figure 3:
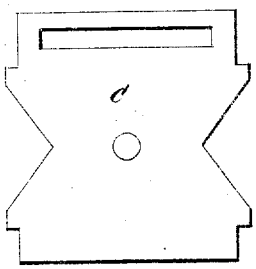
Figure 5:
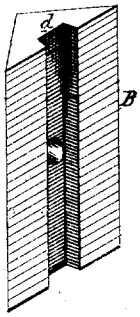

Figure 1 is a front view of a hanger and axle-box embodying my improvement. Fig. 2 is a section on line 1 2, Fig. 1. Fig. 3 is a top view of the box. Fig. 4 is a perspective view of one of the legs of the hanger. Fig. 5 is a perspective view of one of the V-shaped guides.

The inner side of each leg of the hanger A is provided with a rib, *c*, Figs. 2 and 4, which fits snugly in a recess or channel, *d*, Figs. 2 and 5, formed in an adjustable guide, B, the latter being secured to the leg of the hanger by a bolt, *b*, which passes through the guide and through the leg, and has on its outer end a nut, *e*. The inner face of each guide B is V-shaped, and is adapted to a V-shaped groove in the side of an axle-box, C, and between the top of the latter and the hanger intervenes an ordinary gum-elastic spring, X, (shown by dotted lines,) or other suitable spring. As the car and its hangers rise and fall the guides B will slide freely in the recesses at the sides of the box, while the latter will not only be maintained in its proper vertical position, but also, in consequence of the shape of the guides, will be retained so firmly between the arms *a a* that it will effectually resist any tendency on the part of the axle and wheels to force it outward or inward. When the guides have become so worn away that the box fits loosely between them, the nuts *e e* are loosened, each guide is brought firmly against the adjacent side of the box, and the space between the guide and the leg of the hanger is filled by inserting in the same thin sheets, *x*, of metal or other suitable material. The guides, after being thus adjusted, are then secured in their position by tightening the nuts *e e*. The guides may be repeatedly adjusted in this manner (additional plates, *x*, being introduced at each adjustment) until they are so worn away as to be no longer serviceable, when they may be replaced by new guides. The rib *c* on each leg of the hanger, above referred to, performs an important part in attaching the guides to the hanger, inasmuch as it assists, in combination with one single bolt, in maintaining the guides in a vertical position, and prevents any lateral movement of the same, while at the same time an additional advantage is secured in having but one bolt to each guide, by which means the guides may be readily repacked or set out, without taking the hanger or axle-box apart.

What I claim as my invention is—

1. The combination of V-shaped guides B B with the hanger A and box C, substantially as and for the purpose set forth.

2. The bolts *b b*, in combination with the rib *c* on each leg of the hanger, and recess or channel *d* in the guides, substantially as and for the purpose set forth.

3. The combination, with the legs of the hanger A, of the V-shaped guides B B, bolts *b b*, nuts *e e*, and strips *x*, substantially as and for the purpose set forth.

ALBERT A. FREEMAN.

Witnesses:
ISAAC R. OAKFORD,
ALEXANDER H. MORGAN.